United States Patent
Feilkas et al.

(10) Patent No.: US 9,214,028 B2
(45) Date of Patent: Dec. 15, 2015

(54) METHOD FOR SEGMENTING A THREE-DIMENSIONAL IMAGE DATA SET, CORRESPONDING COMPUTER PROGRAM AND CORRESPONDING SYSTEM

(75) Inventors: Thomas Feilkas, Vaterstetten (DE); Manfred Weiser, Munich (DE)

(73) Assignee: Brainlab AG, Feldkirchen (DE)

( * ) Notice: Subject to any disclaimer, the term of this patent is extended or adjusted under 35 U.S.C. 154(b) by 1788 days.

(21) Appl. No.: 12/358,523

(22) Filed: Jan. 23, 2009

(65) Prior Publication Data
US 2009/0207171 A1 Aug. 20, 2009

Related U.S. Application Data

(60) Provisional application No. 61/023,923, filed on Jan. 28, 2008.

(30) Foreign Application Priority Data

Jan. 24, 2008 (EP) .................................. 08150623

(51) Int. Cl.
G06T 15/00 (2011.01)
G06T 17/00 (2006.01)
(Continued)

(52) U.S. Cl.
CPC .............. *G06T 7/0089* (2013.01); *G06T 15/20* (2013.01); *G06T 17/20* (2013.01); *G06T 19/00* (2013.01)

(58) Field of Classification Search
CPC ......... G06T 19/00; G06T 17/20; G06T 15/20; G06T 11/00; G06T 2210/44; G06T 7/0012; G06T 2007/10116; G06T 7/0081; G06T 7/0065; G09G 5/14; A61B 5/06; A61B 6/032; A61B 19/5244; G06K 9/6203

USPC .................. 345/419, 420, 427; 600/424–427
See application file for complete search history.

(56) References Cited

U.S. PATENT DOCUMENTS 6,195,409 B1 * 2/2001 Chang et al. ..................... 378/20
6,711,432 B1 * 3/2004 Weiss et al. .................... 600/427
(Continued)

FOREIGN PATENT DOCUMENTS

DE 196 39 615 9/1996
EP 1348393 10/2003
(Continued)

OTHER PUBLICATIONS de Bruijne et al., "Active shape models exploiting slice-to-slice correlation in segmentation of 3D CTA AAA images", 2001, pp. 1-8.
(Continued)

*Primary Examiner* — Ke Xiao
*Assistant Examiner* — Andrew Shin
(74) *Attorney, Agent, or Firm* — Tucker Ellis, LLP

(57) ABSTRACT

The present invention relates to a method for segmenting a three-dimensional image data set, comprising the steps of:
a) providing a three-dimensional image data set of a body structure, which is to be segmented, and a generic model of the body structure;
b) generating synthetic two-dimensional image data sets on the basis of the three-dimensional image data set of the body structure provided in a); and
c) pre-positioning the generic model in relation to the three-dimensional image data set of the body structure provided in a); and
e) generating a three-dimensional model of the body structure by fitting the generic model to the synthetic two-dimensional image data sets of the body structure, generated in step b).

13 Claims, 2 Drawing Sheets

Figure 1:
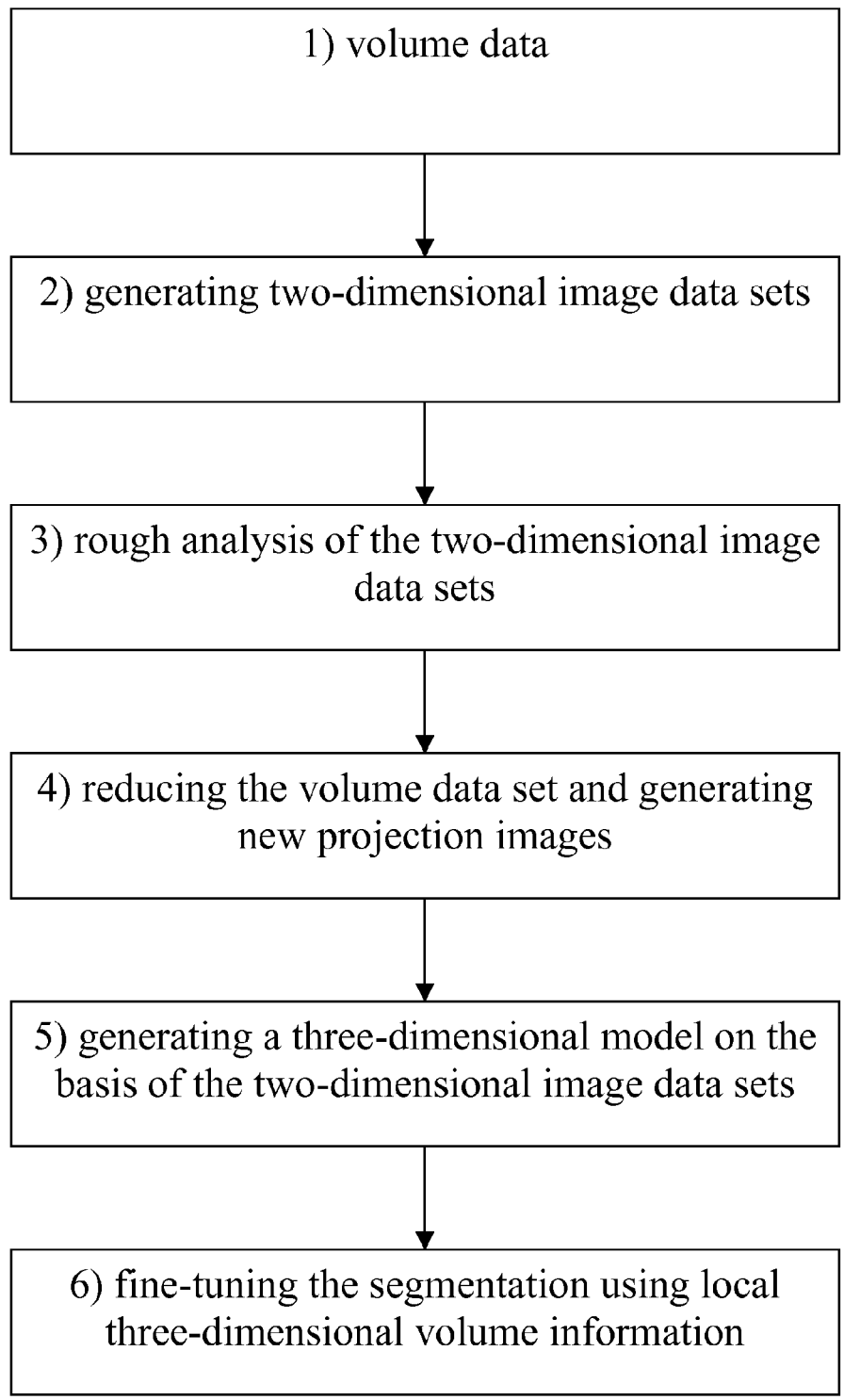

(51) Int. Cl.
*G06T 15/20* (2011.01)
*G09G 5/00* (2006.01)
*G06K 9/00* (2006.01)
*G06K 9/34* (2006.01)
*G06K 9/62* (2006.01)
*A61B 5/05* (2006.01)
*G06T 7/00* (2006.01)
*G06T 19/00* (2011.01)
*G06T 17/20* (2006.01)

(56) References Cited

U.S. PATENT DOCUMENTS

| | | | | |
|---|---|---|---|---|
| 2002/0052875 | A1* | 5/2002 | Smith et al. | 707/10 |
| 2005/0004451 | A1* | 1/2005 | Vilsmeier et al. | 600/426 |
| 2005/0015003 | A1* | 1/2005 | Lachner et al. | 600/424 |
| 2006/0204067 | A1* | 9/2006 | Tuma et al. | 382/128 |
| 2007/0223800 | A1* | 9/2007 | Guehring | 382/131 |
| 2008/0225044 | A1* | 9/2008 | Huang et al. | 345/420 |

FOREIGN PATENT DOCUMENTS

| | | |
|---|---|---|
| EP | 1348394 | 10/2003 |
| EP | 1498851 | 1/2005 |
| EP | 1 868 157 | 12/2007 |
| FR | 2 810 769 | 12/2001 |
| WO | 01/22368 | 3/2001 |

OTHER PUBLICATIONS

Lötjönen et al., "Reconstruction of 3-D Geometry Using 2-D Profiles and a Geometric Prior Model", IEEE Transactions on Medical Imaging, IEEE Service Center, Oct. 1999.

Dong et al., "Automatic Extraction of a Femur Contours from Calibrated Fluoroscopic Images", Applications of Computer Vision, 2007, Feb. 2007.

* cited by examiner

METHOD FOR SEGMENTING A THREE-DIMENSIONAL IMAGE DATA SET, CORRESPONDING COMPUTER PROGRAM AND CORRESPONDING SYSTEM

FIELD OF THE INVENTION

The present invention relates to processing image data in the field of medical technology. Specifically, the present invention relates to a method for segmenting a three-dimensional image data set, a corresponding computer program product comprising a program code for performing the segmenting method in accordance with the invention, and a system for segmenting a three-dimensional image data set.

BACKGROUND

The invention can be used in navigation-assisted operations and can be adduced for planning operative incisions. Briefly outlined: in navigation-assisted operations, the current position of a patient or part of a patient's body on the one hand, and the position of medical treatment apparatus such as for example a scalpel on the other, is detected by a detection unit, and the detected position data are assigned to body structure data, which for example can be a model of a bone surface, in order to use the body structure data together with the position data during a navigation-assisted operation and/or when planning operative incisions. Such a navigation system is for example described in DE 196 39 615 C2.

In the following, segmenting an image data set is to be understood to mean that at least one region of the image data set is assigned to at least one body structure. For example, image regions can be determined which depict individual vertebra of a complete spine. In this respect, segmentation facilitates the interpretation and comprehension of available image data.

Segmenting two-dimensional image data sets and also three-dimensional image data sets (volume data sets) is known in the prior art. Such image data sets can be generated using imaging methods which are common in the medical field. A two-dimensional image data set is for example generated in a conventional x-ray recording or an ultrasound recording. Three-dimensional image data sets are for example generated in a computer tomograph or in a recording by means of a nuclear spin tomograph. Where these image data sets are to be segmented, segmenting three-dimensional image data sets has proven particularly complicated, as compared to segmenting two-dimensional image data sets. The methods for segmenting two-dimensional image data sets are relatively well developed in the non-medical sector in particular, for example in face recognition methods.

In the field of segmenting two-dimensional image data sets, so-called snake methods or also balloon methods are used, which are model-based methods in which closed paths are defined around or within the region to be assigned (the body structure). Preferably using iterative methods, said paths are approximated to the actual two-dimensional structure of the region to be identified, by using snakes from outside inwards and balloons from inside outwards.

Attempts have been made to use the known segmenting methods for two-dimensional image data sets, outlined above, for three-dimensional image data sets as well, wherein the three-dimensional image data sets were broken down into a number of two-dimensional image data sets, and segmentation for the two-dimensional image data sets was individually performed in each case. However, this is problematic, since the relations between the individual layers of the two-dimensional representation can be lost. The transition between the individual layers is unsatisfactory, and the results of segmentation for each individual layer are often not consistent with the results for the preceding layer.

Attempts have also been made to segment three-dimensional image data sets directly. For this purpose, for example, an atlas-based method was used which uses a pre-segmented volume, the so-called atlas, wherein segmentation is already performed once beforehand on the basis of a model which correctly represents a body structure for most patients, and an attempt is made to perform segmentation by fitting said model to the actually available patient data. However, this is a computationally very time-consuming process.

DESCRIPTION OF THE INVENTION

It is the object of the present invention to provide an improved method for segmenting a three-dimensional image data set.

This object is solved by the subject of the independent claims. Dependent claims are directed to preferred embodiments of the invention.

The segmenting method in accordance with the invention combines, in a novel way, method steps which are already known in their own right, and so solves the problem of three-dimensional segmentation, wherein the method in accordance with the invention offers in particular the advantage of reducing the complexity of the information in the three-dimensional volume, and so enables an increase in speed in the segmenting method. The computational power needed in the segmenting method is reduced, as is the computing time. In accordance with a preferred embodiment, it is possible to perform a fully automatic segmenting method, wherein it is possible to perform the individual method steps with different demands on the level of precision; it is in particular possible to initially perform a rough segmentation and to subsequently fine-tune the segmentation.

A method in accordance with the invention for segmenting a three-dimensional image data set comprises the following steps:
a) providing a three-dimensional image data set of a body structure, which is to be segmented;
b) generating synthetic two-dimensional image data sets on the basis of the three-dimensional image data set of the body structure provided in a), for fitting a generic model, in particular a predetermined generic model, of the body structure;
c) pre-positioning the generic model in relation to the three-dimensional image data set of the body structure provided in a);
d) in accordance with a preferred embodiment, reducing the three-dimensional image data set to a region around the pre-positioned generic model, and generating new two-dimensional image data sets for the reduced three-dimensional image data set;
e) generating a three-dimensional model of the body structure by fitting the generic model to the synthetic two-dimensional image data sets of the body structure, generated in items b) or d).

The generic model of the body structure is in particular predetermined and is for example provided in a file.

Preferably, the three-dimensional image data set consists of three-dimensional CT data or three-dimensional MRT data or other forms of three-dimensional imaging data such as for example three-dimensional fluoroscopy data. The body structure can for example be a bone, in particular an individual vertebra of the spine or an intervertebral disc. It can, however, also be a soft-tissue structure such as for example particular regions of the brain or a tumour situated therein.

The three-dimensional image data set of a body structure, which is to be segmented, is provided, i.e. the three-dimensional image data set can first be generated by means of a recording apparatus, such as for example a computer tomograph or a magnetic resonance tomograph, or the three-dimensional image data set of a body structure, which is to be segmented, can also already be available in the form of a data set.

In step b) of the method, synthetic two-dimensional image data sets are generated on the basis of the provided three-dimensional image data set of the body structure; this means that no actual two-dimensional image data sets of the body structure are generated by means of a recording apparatus, but rather that the two-dimensional image data sets are artificially generated from the data of the three-dimensional image data set of the body structure. For this purpose, a particular form of recording, which results in a two-dimensional image data set, can for example be simulated, wherein it is in principle possible to simulate any type of imaging which results in a two-dimensional image data set. This can for example be a perspective two-dimensional depiction (such as for example in a conventional fluoroscopic recording), but is preferably a non-perspective two-dimensional image projection, such as for example an orthographic projection. Within the framework of simulated orthographic projection, a cuboid imaging ray is used and/or simulated. This form of imaging is particularly simple and can therefore be simulated with very little computational requirement. An algorithm for generating synthetic two-dimensional image data sets is described in "FAST VOLUME RENDERING USING A SHEAR-WARP FACTORIZATION OF THE VIEWING TRANSFORMATION", Philippe G. Lacroute, Technical Report: CSL-TR-95-678, Computer Systems Laboratory, Departments of Electrical Engineering and Computer Science, Stanford University, September 1995.

In method step e), a three-dimensional model of the body structure is generated on the basis of the generated synthetic two-dimensional image data sets by fitting the generic model of the body structure. Method step e) is thus equivalent to actual segmentation. The three-dimensional model generated allows regions of the three-dimensional image data set to be assigned to the body structure as desired.

The method in accordance with the invention for segmenting a three-dimensional image data set comprises the method step c): pre-positioning the generic model in relation to the three-dimensional image data set of the body structure provided in a). This is preferably a rough analysis of the synthetic two-dimensional image data sets generated, in order to determine information concerning an initial positioning of the generic model in relation to the synthetic two-dimensional image data sets. For a three-dimensional data set of the hip-femur region for example, the centre of the femoral head, the femoral axis and the neck axis are determined on the basis of the synthetic two-dimensional image data sets, whereby both a rough position of the femoral bone and its extent in the two-dimensional and three-dimensional data sets is obtained. For other body structures, similar parameters would be considered which allow a rough position of the generic model to be calculated in a simple way. In accordance with a preferred embodiment, the analysis is performed in the form of a pre-registration in which morphological parameters of the body structure are automatically determined. Automatically determining morphological parameters is described for example in "Automatic Extraction of Femur Contours from Calibrated X-Ray Images using Statistical Information" (Xiao Dong, Miguel A. Gonzalez Ballester, Guoyan Zheng), Journal of Multimedia, Volume 2, No. 5, September 2007, Chapter "IV. AUTOMATED INITIALIZATION OF THE STATISTICAL MODEL". In accordance with another preferred embodiment, automatic pre-registration on the basis of automatically determining morphological parameters is replaced with a pre-registration consisting of at least one manual method step. This at least one manual method step is preferably that of manually identifying landmarks in the three-dimensional image data set, i.e. manually identifying particularly conspicuous and characteristic points in the three-dimensional image data set, or manually positioning the generic model on the basis of the synthetic two-dimensional image data sets or the three-dimensional image data set.

In accordance with another preferred embodiment, in the optional item d) after pre-registration, the three-dimensional image data set is reduced on the basis of the generic model, and new two-dimensional image data sets for the reduced three-dimensional image data set are generated. For example, an envelope ("bounding box") is placed around the generic model and used to cut a smaller three-dimensional image data set—which mainly comprises the structure to be segmented—out of the original three-dimensional image data set. This smaller three-dimensional image data set is used to generate new synthetic two-dimensional image data sets which are then used for fitting the generic model. This both reduces the computing time of the method for segmenting a three-dimensional image data set and creates the possibility of generating synthetic two-dimensional image data sets which cannot be usefully evaluated in reality. For example, if an x-ray recording of the hip is taken through the femoral head and along the left-right direction of the patient, it is not possible to analyse the femur. In the recording described, both the left-hand and right-hand femoral head can be seen, and the two superpose each other. In the synthetic recording, the desired femur for example would be cut out of the original three-dimensional image data set on the basis of the positioning the generic model, thus enabling a synthetic version of the recording described above, in which there are no disruptive superpositions. It is then possible to generate optimum synthetic two-dimensional image data for the respective body structure, which also contain fewer disruptive artefacts by being restricted to the reduced three-dimensional image data set.

The way in which method step e) of the method for segmenting a three-dimensional image data set can be realised is known in principle in the prior art in another context and/or has already been developed earlier by the Applicant and filed as a patent application. It is in particular possible to use methods from 2D-3D reconstruction processes which are known in their own right for generating a three-dimensional model of the body structure on the basis of the generated synthetic two-dimensional image data sets of the body structure. Thus, for example, the Applicant's European patent application EP 06 012 256 (application number) discloses a corresponding 2D-3D reconstruction method, wherein a generic model of the body structure is provided, and at least one two-dimensional image of the generic model of the body structure is generated. The generic model is a model which can for example have been generated from a statistical model using a principle analysis of different components. The generic model of the body structure is then mapped onto a two-dimensional image data set. This is preferably a synthetic mapping, i.e. the projection image of the generic model is generated in a purely computational way. In accordance with a preferred embodiment, step e) of the segmenting method in accordance with the invention comprises fitting the three-dimensional model to be generated, on the basis of image similarity between the synthetic two-dimensional image data sets generated in step b) or d) on the one hand, and the at least one two-dimensional image of the generic model of the body structure on the other. The way in which this fit is to be performed on the basis of image similarity is sufficiently known in the prior art, wherein reference is preferably made to particularly distinct points in the two-dimensional image data sets which are to be compared to each other, their properties and their orientation, wherein the three-dimensional model to be generated is preferably fitted until (if the spatial orientation is already correct) its shape or outline in a corresponding two-dimensional representation is a sufficiently good match to the at least one two-dimensional image of the generic model of the body structure. The three-dimensional model is preferably a so-called "point distribution model" (PDM). Further details in this respect may be gathered from the following publications: "Building a Complete Surface Model from Sparse Data Using Statistical Shape Models: Application to Computer Assisted Knee Surgery System" (Markus Fleute, Stéphane Lavallée), Lecture Notes in Computer Science, Volume 1496; Proceedings of the First International Conference on Medical Image Computing and Computer-Assisted Intervention, 1998, Springer Publishing, London, UK ISBN 3-540-65136-5, pages 879-887; and "Automatic Extraction of Femur Contours from Calibrated X-Ray Images using Statistical Information" (Xiao Dong, Miguel A. Gonzalez Ballester, Guoyan Zheng), Journal of Multimedia, Volume 2, No. 5, September 2007, Chapter "III. CALIBRATED X-RAY IMAGES AND THE STATISTICAL MODEL", paragraph "B. Statistical model of the proximal femur".

In accordance with a preferred embodiment, the generic model of the body structure is a purely geometric generic model. In a geometric model, the internal structure of the model is disregarded. Thus, for example, the entire internal structure of the body structure can be completely disregarded in a geometric generic model. In this respect, this is a very simple generic model. Using such a geometric generic model is expedient when only surface structures of a body structure are of interest for segmentation. This is for example the case when a strict distinction is to be drawn between a vertebra and the inserted intervertebral disc; the internal structure of the vertebra itself is, by contrast, of secondary interest in this regard.

The result of method step e) is that the desired body structure is segmented on the basis of the generic model, using the synthetic two-dimensional image data sets. On the basis of its statistical knowledge, the generic model can reconstruct a large portion of the variations in a body structure. However, it may be assumed that particular regions have not necessarily been optimally reconstructed, for example if the regions cannot be clearly identified in the synthetic two-dimensional image data sets or if the shape of the body structure is not part of the statistical knowledge of the generic model. In accordance with a preferred embodiment of the invention, and proceeding from the result of method step e), a concluding subsequent correction of the result is performed on the basis of the three-dimensional image data, in order to increase the level of precision in the method. Using the preceding method steps, a three-dimensional model is obtained which is precisely positioned in the three-dimensional image data and only has to be fitted locally. As compared to a model-based segmenting method which is based only on the three-dimensional image data, this has the advantage of a restricted search domain and therefore a significant saving in time and a greater reliability of achieving a precise result of segmentation.

In accordance with another aspect of the invention, the invention is directed to a computer program product comprising a program code for performing the segmenting method in accordance with the invention. The computer program product is for example a CD-ROM or a DVD, wherein the program code can be written in any programming language.

In accordance with another aspect, the invention is directed to a system for segmenting a three-dimensional image data set. This initially comprises a recording unit which is configured to provide a three-dimensional image data set of a body structure, which is to be segmented. Said recording unit is an imaging apparatus such as for example a three-dimensional C-arc, a computer tomograph or a magnetic resonance tomograph.

The system in accordance with the invention also comprises a computational unit such as for example a computer which is configured to capture, in terms of data processing, the three-dimensional image data set which is provided by the recording and is to be segmented. The computational unit can be integrated into the recording unit, or it can be provided separately from the recording unit. In the latter case, it is possible for a data medium, such as for example a CD-ROM or a memory stick for being read out to be inputted into the computational unit. The computational unit is also configured to generate synthetic two-dimensional image data sets on the basis of the three-dimensional image data set of the body structure which has already been captured by the computational unit. These synthetic two-dimensional image data sets are artificially generated two-dimensional image data sets, wherein very simple projections are preferably used, such as for example an orthographic projection. The computational unit is also configured to generate a three-dimensional model of the body structure on the basis of the synthetic two-dimensional image data sets of the body structure which are generated by the computational unit. The statements in the description with regard to the method for segmenting the three-dimensional image data set apply analogously to all the processes which are executed in the computational unit.

The system in accordance with the invention for segmenting a three-dimensional image data set also comprises an output unit for outputting the generated three-dimensional model of the body structure, wherein this can for example be a display unit such as for example a screen. The output unit can however also merely be configured to generate a file. This file can be read out later as required, or can be displayed on a different display apparatus.

Overall, the system in accordance with the invention for segmenting a three-dimensional image data set is suitable for this purpose and is also specifically configured for the purpose of performing the method in accordance with the invention for segmenting a three-dimensional image data set, as described above. All the preferred embodiments of the segmenting method in accordance with the invention can be realised with the aid of the system for segmenting a three-dimensional image data set.

Figure 2:
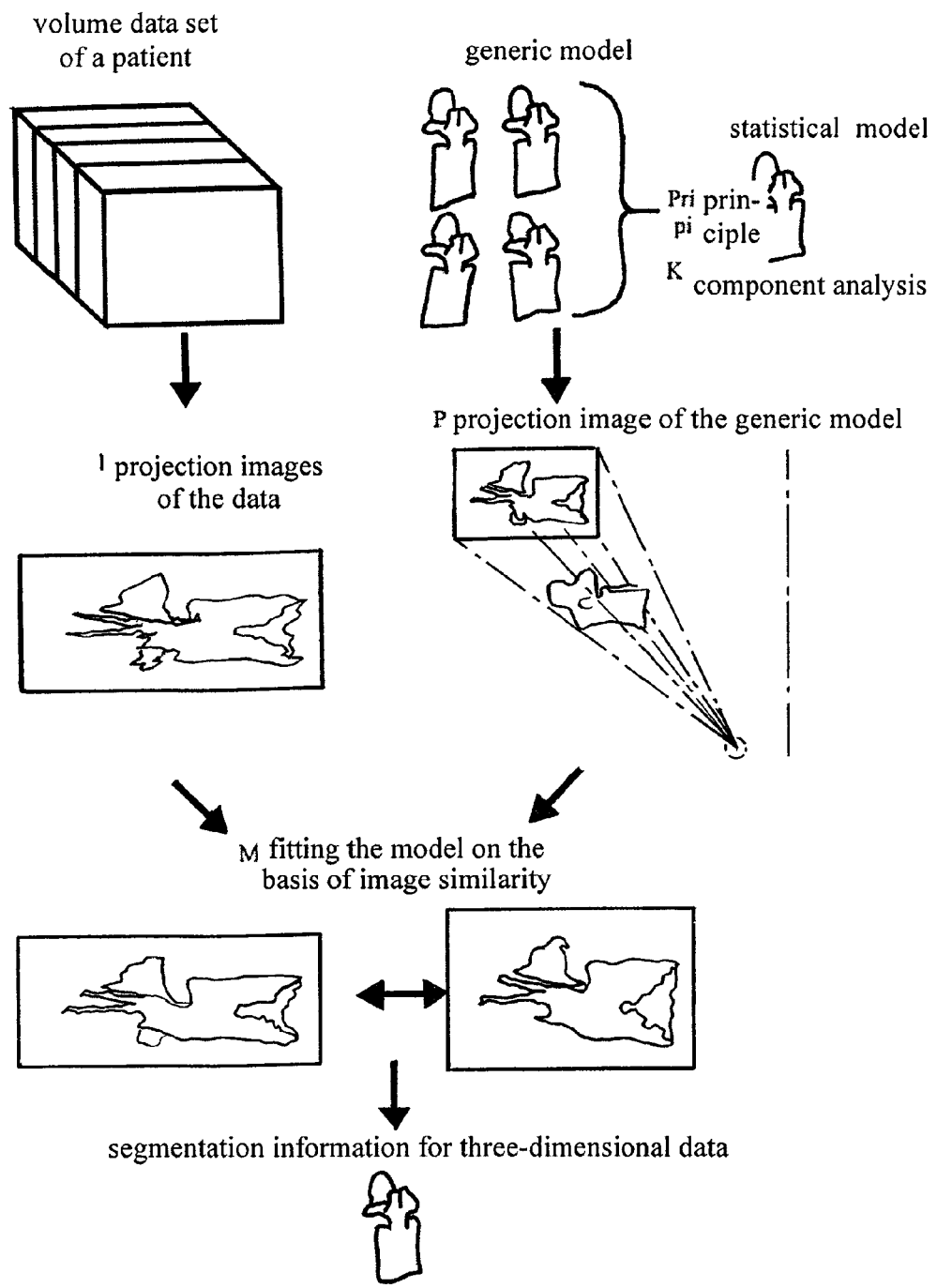

The invention shall be understood even better on the basis of the enclosed drawings, which show:

FIG. 1 a flow diagram of a segmenting method in accordance with the invention;

FIG. 2 an overview of a model-based segmenting method.

The flow diagram shown in FIG. 1 offers a good overview of a segmenting method in accordance with the invention, wherein the method steps 1, 2, 3 and 5 shown in FIG. 1 form the essential method steps of the segmenting method, which correspond to method steps a), b), c) and e) in accordance with claim 1.

In a first method step, volume data are provided. These volume data are for example three-dimensional image data which have been acquired by means of a computer tomograph or a magnetic resonance tomograph. These data are to be segmented, i.e. at least one region of the volume data set is to be assigned to at least one body structure. In step 2 of the embodiment of the invention shown by way of example in FIG. 1, two-dimensional image data sets are generated for this purpose, which can be any types of synthetic two-dimensional image data sets. It is possible, for example, to simulate a recording by means of a C-arc. In practice, however, a simpler form of two-dimensional recording is preferred, which is easier to simulate in terms of data processing. This is for example the case with the orthographic projection already mentioned, which uses a cuboid imaging ray.

In accordance with the preferred embodiment of the method in accordance with the invention, which is shown in FIG. 1, the generic model is pre-positioned in a third method step in relation to the three-dimensional image data set of the body structure provided in step 1. In the example embodiment described, this is a rough analysis of the synthetic two-dimensional image data sets generated, in order to determine information concerning an initial positioning of the generic model in relation to the synthetic two-dimensional image data sets.

In a subsequent method step 4, the three-dimensional image data set is reduced on the basis of the generic model, and new two-dimensional image data sets for the reduced three-dimensional image data set are generated. In the example embodiment described, an envelope ("bounding box") is placed around the generic model for this purpose, which is used to cut a smaller three-dimensional image data set—which substantially comprises the structure to be segmented—out of the original three-dimensional image data set. This smaller three-dimensional image data set is used to generate new synthetic two-dimensional image data sets which are then used for fitting the generic model. This enables the computing time of the method for segmenting a three-dimensional image data set to be reduced and also creates the possibility of generating synthetic two-dimensional image data sets which could not otherwise be generated in reality.

In method step 5, a three-dimensional model is generated on the basis of the two-dimensional image data sets. This method step is the actual segmenting step, i.e. assigning regions of the image data set to a particular body structure is enabled and performed.

Method step 6 is an optional method step employed in accordance with the preferred embodiment shown in FIG. 1. Method step 6 consists of a fine-tuning which is performed in order to improve the ascertained segmentation using local three-dimensional volume information.

FIG. 2 provides an overview of a model-based segmenting method. In this context, model-based means that when generating the three-dimensional model of the body structure on the basis of the generated synthetic two-dimensional image data sets of the body structure, reference is made to a generic model which has been generated beforehand and/or to a projection image of the generic model.

The first starting point for the segmenting method shown by way of example in FIG. 2 is formed by the volume data set of a patient, wherein this can for example consist of three-dimensional CT data or three-dimensional MRT data. A particular body structure of the patient, such as for example the spine including various individual vertebrae, has been imaged three-dimensionally by means of a suitable recording method. The volume data set is then broken down in accordance with the invention, i.e. various projection images which depict a particular body structure are acquired from said volume data set. In the example in accordance with FIG. 2, this is a particular vertebra. In principle, any types of projections can be used for generating the two-dimensional representations of the body structure—in the present case, the vertebra; preferably, however, computationally simple method are used, such as for example orthographic projection, in which a cuboid imaging ray is used.

The second starting point for the method in accordance with the invention for segmenting a three-dimensional image data set is formed by a generic model of the body structure to be imaged—in this case, a vertebra. This generic model takes into account how a particular vertebra is formed in a statistical cross-section, i.e. averaged over a multitude of people. A vertebra exhibits varyingly distinct features, depending on its position in the spine. A generic model is generated on the basis of a principle component analysis. At least one projection image of the generic model is calculated from this generic model, wherein the type of imaging and the imaging conditions are defined, and a projection image of the generic model is artificially generated by a computational process.

Once the projection images of the patient data and the at least one projection image of the generic model have been obtained, the model is fitted on the basis of image similarities between the two-dimensional images, wherein particularly distinct points in the two-dimensional images are identified, and their orientation in the image is ascertained. The three-dimensional model of the vertebra, which is acquired on the basis of the generated synthetic two-dimensional image data sets of the vertebra, is then fitted until a sufficiently precise match between the two-dimensional projection images of the patient data and the projection image of the generic model has been achieved. If this is the case, then the sought-after segmentation information for the three-dimensional data is acquired from this, and it is clear which regions of the three-dimensional image data set represent the vertebra and which represent the vicinity of the vertebra.

The method in accordance with the invention for segmenting a three-dimensional image data set allows segmentation to be performed to a high level of precision within a short computing time. The computing time can in particular be reduced by the fact that the projection images used (two-dimensional image data sets) can be generated in a freely selectable way. For this purpose, it is in particular not necessary to already have foreknowledge regarding segmentation. In the segmenting method in accordance with the invention, it is also possible to omit the step of incorporating knowledge concerning a recording apparatus being used into the simulation. The orthographic projection method in particular, which has been described in numerous cases, is practically free from apparatus-specific recording parameters.

The invention claimed is:

1. A method for segmenting a three-dimensional image data set, comprising:
   a) providing a three-dimensional image data set of a body structure, which is to be segmented, and a generic model of the body structure;
   b) generating synthetic two-dimensional image data sets on the basis of the three-dimensional image data set of the body structure provided in a);
   c) pre-positioning the generic model in relation to the three-dimensional image data set of the body structure provided in a); and
   e) generating a three-dimensional model of the body structure by fitting the generic model to the synthetic two-dimensional image data sets of the body structure using image similarity between the synthetic two-dimensional image data sets and two-dimensional image data sets of the generic model.

2. The method in accordance with claim 1, wherein an orthographic projection is used to generate the synthetic two-dimensional image data sets in accordance with step b).

3. The method in accordance with claim 1, further comprising the following step between steps c) and e):
   d) reducing the three-dimensional image data set on the basis of the generic model, and generating new two-dimensional image data sets for the reduced three-dimensional image data set.

4. The method in accordance with claim 1, wherein step c) comprises a pre-registration in the form of automatically determining morphological parameters of the body structure.

5. The method in accordance with claim 1, wherein step c) comprises a pre-registration using at least one manual method step, preferably that of manually identifying landmarks in the three-dimensional image data set.

6. The method in accordance with claim 1, wherein a direction of projection of the two-dimensional image data sets is automatically identified.

7. The method in accordance with claim 6, wherein the generic model of the body structure is a purely geometric generic model of the body structure.

8. The method in accordance with claim 7, further comprising the following step after step e):
   f) fine-tuning the three-dimensional model generated.

9. A computer program embodied on a non-transitory computer readable medium, wherein when the computer program is executed by a processor the steps according to claim 1 are performed.

10. A system for segmenting a three-dimensional image data set, comprising:
    a recording unit which is configured to provide a three-dimensional image data set of a body structure, which is to be segmented; and
    a computational unit which is configured to:
    a) capture, in terms of data processing, the three-dimensional image data set which is provided by the recording and is to be segmented;
    b) generate synthetic two-dimensional image data sets on the basis of the captured three-dimensional image data set of the body structure;
    c) pre-position a generic model in relation to the three-dimensional image data set of the body structure provided in a); and
    d) generate a three-dimensional model of the body structure by fitting a provided generic model to the synthetic two-dimensional image data sets of the body structure using image similarity between the synthetic two-dimensional image data sets and two-dimensional image data sets of the generic model;
    an output unit for outputting the generated three-dimensional model of the body structure.

11. The system according to claim 10, wherein the computational unit is configured to reduce the three-dimensional image data set on the basis of the generic model, and generate new two-dimensional image data sets for the reduced three-dimensional image data set.

12. The system according to claim 10, where in performing the pre-positioning of the generic model, the computational unit is configured to perform a pre-registration in the form of automatically determining morphological parameters of the body structure.

13. The system according to claim 12, where in performing pre-registration, the computational unit is configured to use at least one landmark in the three-dimensional image data set that is manually identified.

* * * * *